US012407257B1

United States Patent
Allehyani (10) Patent No.: US 12,407,257 B1
(45) Date of Patent: Sep. 2, 2025

(54) NON-ISOLATED, PARTIAL POWER PROCESSING, DC-DC CONVERTER AND METHOD

(71) Applicant: UNIVERSITY OF JEDDAH, Jeddah (SA)

(72) Inventor: Ahmed Allehyani, Jeddah (SA)

(73) Assignee: UNIVERSITY OF JEDDAH, Jeddah (SA)

( * ) Notice: Subject to any disclaimer, the term of this patent is extended or adjusted under 35 U.S.C. 154(b) by 0 days.

(21) Appl. No.: 19/032,729

(22) Filed: Jan. 21, 2025

(51) Int. Cl.
  *H02M 3/158* (2006.01)
  *H02M 1/14* (2006.01)

(52) U.S. Cl.
  CPC ............. *H02M 3/158* (2013.01); *H02M 1/14* (2013.01)

(58) Field of Classification Search
  CPC .............................. H02M 3/158; H02M 1/14
  See application file for complete search history.

(56) References Cited

U.S. PATENT DOCUMENTS

| | | | |
|---|---|---|---|
| 2017/0054364 A1* | 2/2017 | Ferdowsi | H02M 3/1584 |
| 2022/0407423 A1* | 12/2022 | Chen | H02M 3/1586 |
| 2023/0041194 A1* | 2/2023 | Tang | H02M 1/0051 |
| 2024/0275173 A1* | 8/2024 | Alzahrani | H02J 3/32 |

OTHER PUBLICATIONS

Ahmed Allehyani, "An Interleaved High Gain DC-DC Converter with Direct Power Flow Path". IEEE Energy Conversion Congress and Exposition (ECCE), 978-1-7281-9387-8/22, Oct. 2022, DOI: 10.1109/ECCE50734.2022.9947856.

* cited by examiner

Primary Examiner — Rafael O De Leon Domenech
(74) Attorney, Agent, or Firm — PATENT PORTFOLIO BUILDERS PLLC (57) ABSTRACT

A step-up, non-isolated, direct current (DC)-to-DC converter includes a first inverting boost stage having (1) a first input terminal configured to be electrically connected to a first terminal of a DC voltage source, and (2) a first common terminal configured to be electrically connected to a second terminal of the DC voltage source, a second inverting boost stage having (1) a first input terminal configured to be electrically connected to the second terminal of the DC voltage source, and (2) a second common terminal configured to be electrically connected to the first terminal of the DC voltage source. An output voltage $V_O$ generated by the first and second inverting boost stages, between the first and second output terminals includes at least a direct voltage contribution from the DC voltage source.

12 Claims, 12 Drawing Sheets

FIG. 1

| | |
|---|---|
| Input Voltage (V) | 40 |
| Output Voltage (V) | 200 |
| Duty | 0.5 |
| Switching Frequency (kHz) | 31.33 |
| $C_1$, $C_2$, $C_3$ and $C_4$ (μF) | 100 |
| $L_1$ (μH) | 270 |
| $L_2$ (μH) | 270 |
| Ro (Ω) | 200 |
| $D_1$, $D_2$, $D_3$ and $D_4$ | STTH2002C |
| $S_1$ and $S_2$ | GS66508T |

NON-ISOLATED, PARTIAL POWER PROCESSING, DC-DC CONVERTER AND METHOD

BACKGROUND OF THE INVENTION

Technical Field

Embodiments of the subject matter disclosed herein generally relate to a direct current (DC)-to-DC converter and associated method, and more particularly, to a non-isolated, partial power processing, DC-to-DC converter that boosts an input voltage and reduces an input current ripple.

Discussion of the Background

As a result of the negative effects that are caused by the electricity generation using conventional fossil fuels as the main energy resource, the industries are transitioning to the use of clean renewable energy resources such as solar photovoltaic (PV) panels and wind turbines. Along with the same effort in making the Earth greener, there is a strong push to replace the internal combustion based vehicles, which pollute the environment, with electrical vehicles, i.e., vehicles that use electrical energy stored in batteries for propulsion. Both the solar photovoltaic panels and the vehicle batteries have a rather low voltage output, which necessitates the use of a step-up converter before the voltage can be considered satisfactory. In addition, the current that is pulled from the photovoltaic panel or vehicle batteries should be continuous, with a low amount of ripple in order to lengthen the devices' lifespan. Note that an input current ripple for a DC-to-DC converter is the alternating (AC) component of the input current superimposed on the steady (DC) input current. The AC component is caused by the periodic switching action of the converter's internal components, such as switches and inductors.

The boost converter is the simplest converter to achieve a higher voltage conversion ratio. Nonetheless, the traditional boost converter has a limited step-up capability caused by the nonideal nature of the converter's elements and a high input current ripple that deteriorates the natural life span of the devices associated with the converter, e.g., PV panels. Moreover, the nonideal parasitics that exist in the converter elements drastically decrease its efficiency when a higher voltage gain is desired. Additionally, the current and voltage stresses on the switches used by the converter are equal to the input current and output voltage, respectively, which contribute to reducing the overall efficiency (see [1]). Moreover, the required boost converter's high duty cycle needed to achieve higher voltage gain reduces the duty cycle control margin needed to overcome voltage disturbances.

Thus, there is a need for a new DC-to-DC converter that is capable of stepping up the low voltage produced by the renewable energy resources or electrical vehicle batteries, reducing the input current ripple of the step up stage, and performing energy conversion with high efficiency.

SUMMARY OF THE INVENTION

According to an embodiment, there is a step-up, non-isolated, direct current (DC)-to-DC converter that includes a first inverting boost stage having (1) a first input terminal configured to be electrically connected to a first terminal of a DC voltage source, and (2) a first common terminal configured to be electrically connected to a second terminal of the DC voltage source and a second inverting boost stage having (1) a first input terminal configured to be electrically connected to the second terminal of the DC voltage source, and (2) a second common terminal configured to be electrically connected to the first terminal of the DC voltage source. The first inverting boost stage has a first output terminal configured to be electrically connected to a first terminal of a load. The second inverting boost stage has a second output terminal configured to be electrically connected to a second terminal of the load. An output voltage $V_O$ generated by the first and second inverting boost stages, between the first and second output terminals includes at least a direct voltage contribution from the DC voltage source.

According to another embodiment, there is a step-up, non-isolated, direct current (DC)-to-DC converter that includes a first inverting boost stage having (1) a first input terminal configured to be electrically connected to a first terminal of a DC voltage source, (2) a first common terminal configured to be electrically connected to a second terminal of the DC voltage source, (3) a first switch S1, and (4) a first additional switch S1', and also includes a second inverting boost stage having (1) a first input terminal configured to be electrically connected to the second terminal of the DC voltage source, (2) a second common terminal configured to be electrically connected to the first terminal of the DC voltage source, (3) a second switch S2, and (4) a second additional switch S2'. The first inverting boost stage has a first output terminal configured to be electrically connected to a first terminal of a load. The second inverting boost stage has a second output terminal configured to be electrically connected to a second terminal of the load. An output voltage generated by first and second inverting boost stages, between the first and second output terminals, includes at least a direct voltage contribution from the DC voltage source.

According to yet another embodiment, there is a low-voltage generating system that includes a low-voltage source and a direct current (DC)-to-DC converter electrically connected to the low-voltage source and configured to step up an input voltage received from the low-voltage source. The DC to DC converter includes a first inverting boost stage having (1) a first input terminal configured to be electrically connected to a first terminal of a DC voltage source, (2) a first common terminal configured to be electrically connected to a second terminal of the DC voltage source, (3) a first switch S1, and (4) a first additional switch S1', and a second inverting boost stage having (1) a first input terminal configured to be electrically connected to the second terminal of the DC voltage source, (2) a second common terminal configured to be electrically connected to the first terminal of the DC voltage source, (3) a second switch S2, and (4) a second additional switch S2'. The first inverting boost stage has a first output terminal configured to be electrically connected to a first terminal of a load and the second inverting boost stage has a second output terminal configured to be electrically connected to a second terminal of the load. An output voltage generated by first and second inverting boost stages, between the first and second output terminals, includes at least a direct voltage contribution from the DC voltage source.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a DC-to-DC converter used with a PV panel or an electrical car. However, the embodiments to be discussed next are not limited to such systems, but may be applied to other systems that generate a low voltage.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a high-gain DC-to-DC converter is configured to be non-isolated, i.e., transfers energy between two DC voltage levels without using electrical isolation between the input and output circuits. Unlike isolated converters, which use transformers or optocouplers to physically separate the input and output for safety or noise reduction, non-isolated converters rely on direct electrical connections and typically use components like inductors, capacitors, and switching devices. Further, the high-gain DC-to-DC converter of this embodiment is configured to be a differential partial power processing DC-to-DC converter.

A differential DC-to-DC converter handles differential inputs or outputs. For example, the differential DC-to-DC works with voltages referenced to two different points, rather than a single common ground.

To successfully achieve ripple reduction, the step-up, non-isolated, differential partial power processing, DC-to-DC converter (simply called in this document the "DC-to-DC converter") is configured with at least one polarity reversal stage to create a negative boost converter output. Further, two (upper and lower or first and second) inverting boost stages are differentially connected to the load to generate a higher gain ratio, enabling input current ripple and output voltage ripple reduction. This configuration also reduces the stress on the components (e.g., switches) of the DC-to-DC converter. In a different embodiment, the inductors and the switches are interleaved for each of the upper and lower inverting boost stages to further reduce the ripple effects and further reduce the stress on its components. These embodiments are now discussed with regard to the figures.

Figure 1:
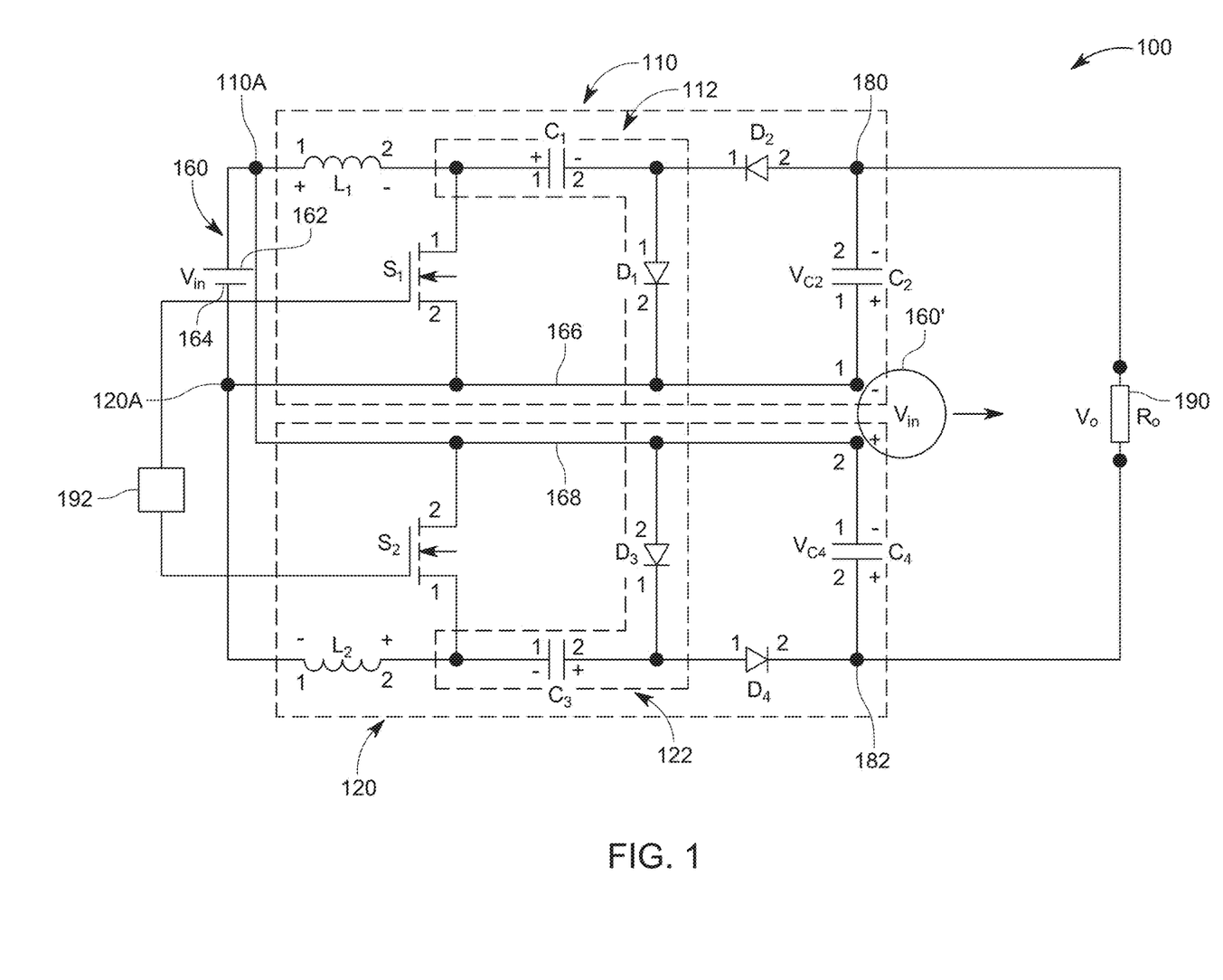
FIG. 1 is a schematic diagram of a DC-to-DC converter that reduces a ripple in an input current.

FIG. 1 shows a DC-to-DC converter 100 that includes an upper (first) inverting boost stage 110 and a lower (second) inverting boost stage 120, which are electrically connected to a supply or input voltage source 160 through corresponding terminals. For example, the upper inverting boost stage 110 has a first input terminal 110A and a first common terminal 166 that are configured to be electrically connected to the terminals of the voltage source 160. The lower inverting boost stage 120 has a first input terminal 120A and a second common terminal 168 that are configured to be electrically connected to the terminals of the voltage source 160. Note that the first input terminal 110A is electrically (directly) connected to the second common terminal 168 and the second input terminal 120A is electrically (directly) connected to the first common terminal 166. The DC-to-DC converter 100 has first and second output terminals 180, 182 that are configured to be electrically connected to a load 190, for example, the motor of a car, or the power utility.

The upper inverting boost stage 110 includes a first inductor L1, which has a first terminal that is electrically, directly, connected to a positive terminal 162 of the voltage source 160. Note that in this document, any element having two terminals, has a first terminal labeled as "1" and the second terminal labeled as "2" for each reference. Also note that the voltage source 160 is a DC source, and may generate any voltage, i.e., 2V, or 20V or 200V, etc. The first inductor L1 has its second terminal electrically connected to a first terminal of a first switch S1 and also to a first terminal of a first inverting module 112. Note that the arrow shown for the first switch S1 indicates an N-type MOSFET transistor, and it implies that the current flows from the drain to the source when the transistor is ON. The same is true for the second switch S2. The first inverting module 112 includes a first capacitor C1 and a first diode D1 arranged as shown in FIG. 1. The first terminal of the first inverting module 112 coincides with a first terminal of the capacitor C1. A second terminal of the capacitor C1 is electrically connected to a first terminal of the first diode D1. A second terminal of the first diode D1 is electrically connected to the first common terminal 166. The first common terminal 166 is also electrically connected to the negative terminal 164 of the voltage source 160. A second terminal of the first switch S1 is electrically connected to the first common terminal 166.

Figure 9:
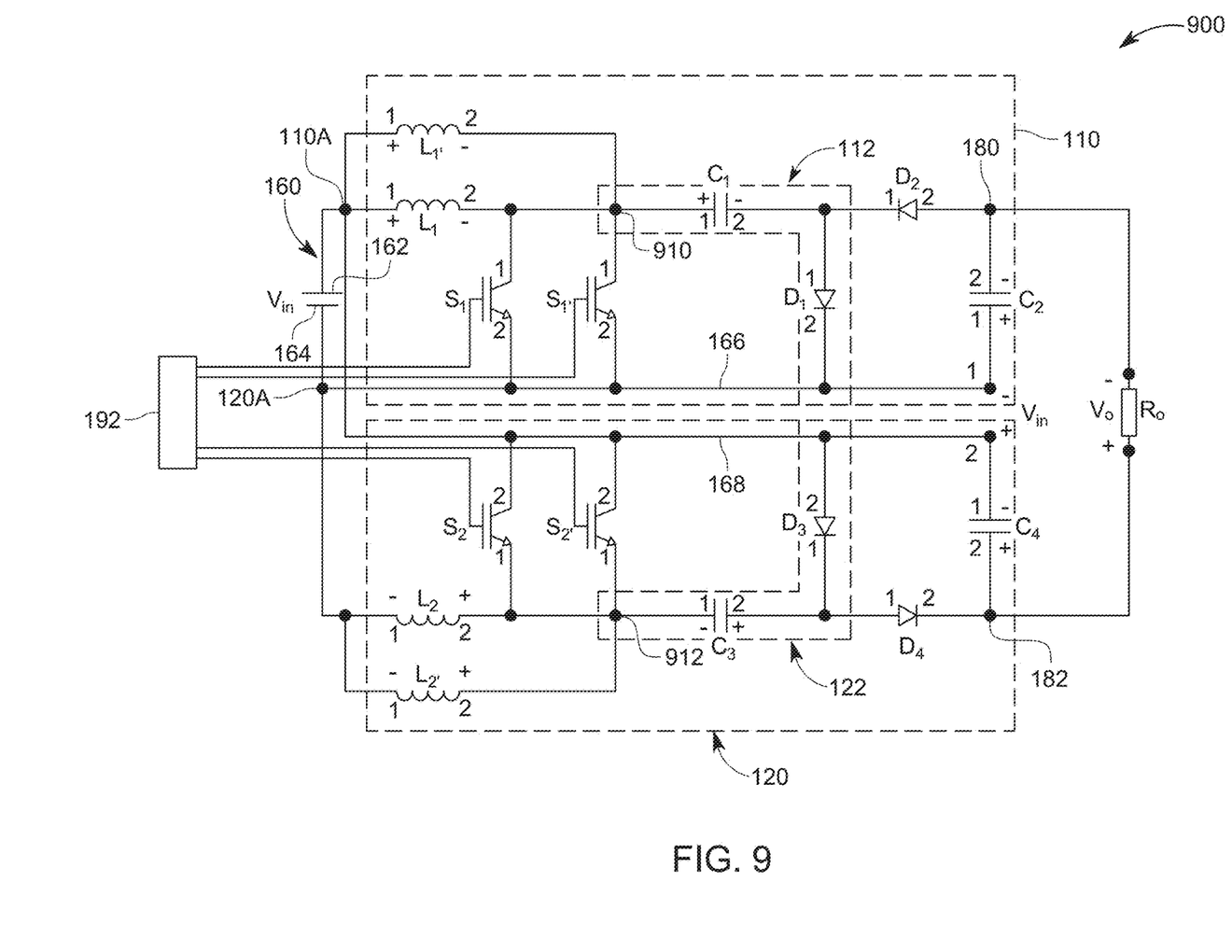
FIG. 9 is a schematic diagram of another DC-to-DC converter that further reduces the ripples in the input current.

The first inductor L1 and the first additional inductor L1' are connected in parallel. The first switch S1 and the first additional switch S1' are connected in parallel. The first inductor L1 and the first additional inductor L1' are connected in series with the first switch S1 and the first additional switch S1', as shown in FIG. 9. This specific connection between the inductors and switches are called "interleaved" in this embodiment. The same configuration is employed for the lower inverting boost stage 120, which is discussed later. Note that the switches S1, S1', S2, and S2' are illustrated in FIG. 9 as being an insulated-gate bipolar transistor (IGBT) while the switches S1 and S2 are illustrated in FIG. 1 as being a Metal-Oxide-Semiconductor Field-Effect Transistor (MOSFET). The purpose of this is to show that any kind of transistor may be used for the converters 100 and 900.

The upper inverting boost stage 110 further includes a second diode D2 and a second capacitor C2. A first terminal of the second diode D2 is electrically connected to a point between the first capacitor C1 and the first diode D1 (i.e., to the second terminal of the first capacitor C1 and the first terminal of the first diode D1). A second terminal of the second diode D2 is electrically connected to the first output terminal 180 of the upper inverting boost stage 110. A first terminal of the second capacitor C2 is electrically connected to the first common terminal 166 and a second terminal of the second capacitor C2 is electrically connected to the first output terminal 180. The reference numbers first and second do not imply a preferred port or terminal and also they do not imply that these ports or terminals must be used in this order. The reference numbers first and second are used simply as labels in this disclosure, for distinguishing one port or terminal from another.

The lower inverting boost stage 120 includes a second inductor L2, which has a first terminal that is electrically, directly, connected to the negative terminal 164 of the voltage source 160. The second inductor L2 has its second terminal electrically connected to a first terminal of a second switch S2 and also to a first terminal of a second inverting module 122. The second inverting module 122 includes a third capacitor C3 and a third diode D3 arranged as shown in FIG. 1. The first terminal of the second inverting module 122 coincides with a first terminal of the third capacitor C3. A second terminal of the third capacitor C3 is electrically connected to a first terminal of the third diode D3. A second terminal of the third diode D3 is electrically connected to the second common terminal 168. The second common terminal 168 is also electrically connected to the positive terminal 162 of the voltage source 160. A second terminal of the second switch S2 is electrically connected to the second common terminal 168.

The lower inverting boost stage 120 further includes a fourth diode D4 and a fourth capacitor C4. A first terminal of the fourth diode D4 is electrically connected to a point between the third capacitor C3 and the third diode D3, i.e., to the second terminal of the capacitor C3 and the first terminal to the third diode D3. A second terminal of the fourth diode D4 is electrically connected to the second output terminal 182. A first terminal of the fourth capacitor C4 is electrically connected to the second common terminal 168 and a second terminal of the fourth capacitor C4 is electrically connected to the second output terminal 182.

This specific arrangement of the DC-to-DC converter 100 ensures the following functions. When the first switch S1 is closed, the voltage source 160 electrically charges the first inductor L1. The same is true for the second inductor L2, when the second switch S2 is closed. When these switches are open, the charged inductors (L1 and/or L2) transfer electrical energy to their corresponding capacitors C2 and C4, which boost the voltage provided by the voltage source, which is supplied to the load 190. In this regard, note that the load 190 "sees" three energy sources connected in series, i.e., (1) the energy stored by the second capacitor C2, (2) the energy between the first and second common terminals 166 and 168, which together act as the voltage source 160, and (3) the energy stored by the fourth capacitor C4.

Note that because the first and second common terminals 166 and 168 are directly connected to the positive and negative terminals of the voltage source 160, a voltage difference between them is equal to the voltage difference across the voltage source 160. For this reason, reference number 160' in FIG. 1 indicates that the entire voltage of the voltage source 160 is being provided to the output terminals (180, 182) of the DC-to-DC converter. Because of the capacitors C2 and C4, which only partially process the power from the voltage source 160, the DC-to-DC converter 100 is also called a partial power processing converter. Further, the arrangement of the elements of the DC-to-DC converter 100 makes the polarities of the voltage across the second capacitor C2, the direct voltage contribution 160', and the voltage across the fourth capacitor C4 to add up constructively, to the total output voltage $V_O$, between the output terminals 180 and 182, which is higher than the input voltage $V_{in}$. In fact, $V_O = V_{C2} + V_{in} + V_{C4}$.

The first inverting module 112 is configured to reverse the polarity of the voltage at the second capacitor C2, so that the second capacitor C2 and the voltage source 160' are connected in series and their voltages add to each other. The second inverting module 122 achieves the same result for the fourth capacitor C4, so that the second capacitor C2, the voltage source 160', and the fourth capacitor C4 are connected in series and their voltages add to each other. Therefore, the voltage available between the first and second output terminals 180 and 182 is $V_{C2} + V_{in} + V_{C4}$.

Figure 2:
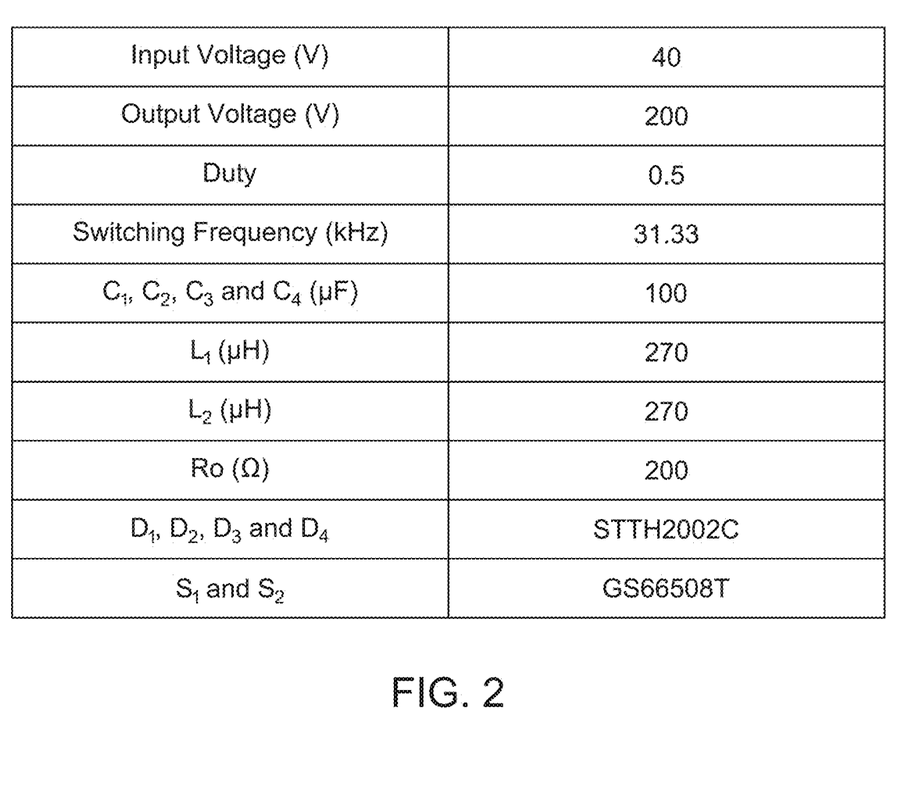
FIG. 2 is a table showing one set of values selected for various components of the DC-to-DC converter of FIG. 1.

The DC-to-DC converter may be provided with a controller 192 (e.g., a processor or a transistor or an integrated circuit, etc.) which controls the closing and opening of the switches S1 and S2. These switches may be implemented with any desired type of transistors. FIG. 2 shows a table indicating one possible set of values for the elements shown in FIG. 1. Note that these values are just an example, and many other sets of values may be selected for the DC-to-DC converter. One skilled in the art would understand that the values of the inductors and capacitors are selected based on the input voltage, desired output voltage, the load, and the switching frequency applied to the switches. For example, the switching frequency may vary between 2 kHz and 200 kHz. In one application, the two inductors L1 and L2 have the same values and the four capacitors C1 to C4 have the same value. In this or another embodiment, the four diodes D1 to D4 are selected to have the same value and to be of the same type. In one embodiment, the two switches S1 and S2 are selected to be transistors of the same type and have the same characteristics.

Figure 3A:
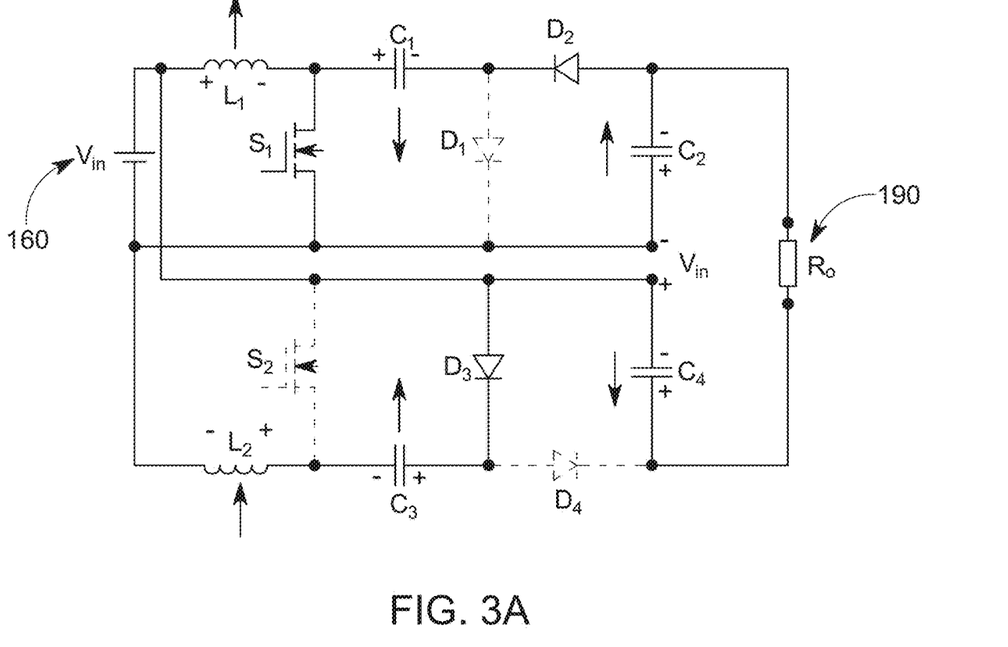
FIG. 3A illustrates a first state of the DC-to-DC converter of FIG. 1.

The operation of the DC-to-DC converter 100 is now being discussed with regard to FIGS. 3A to 3D. Note that when one or more of the components of the converter are not active, for example, a switch is open or a diode is polarized the opposite way, that component is shown in the figure with a dash line to indicate this fact. For example, FIG. 3A shows the switch S2 being open, and the first and fourth diodes D1 and D4 not conducting an electrical current.

Figure 3B:
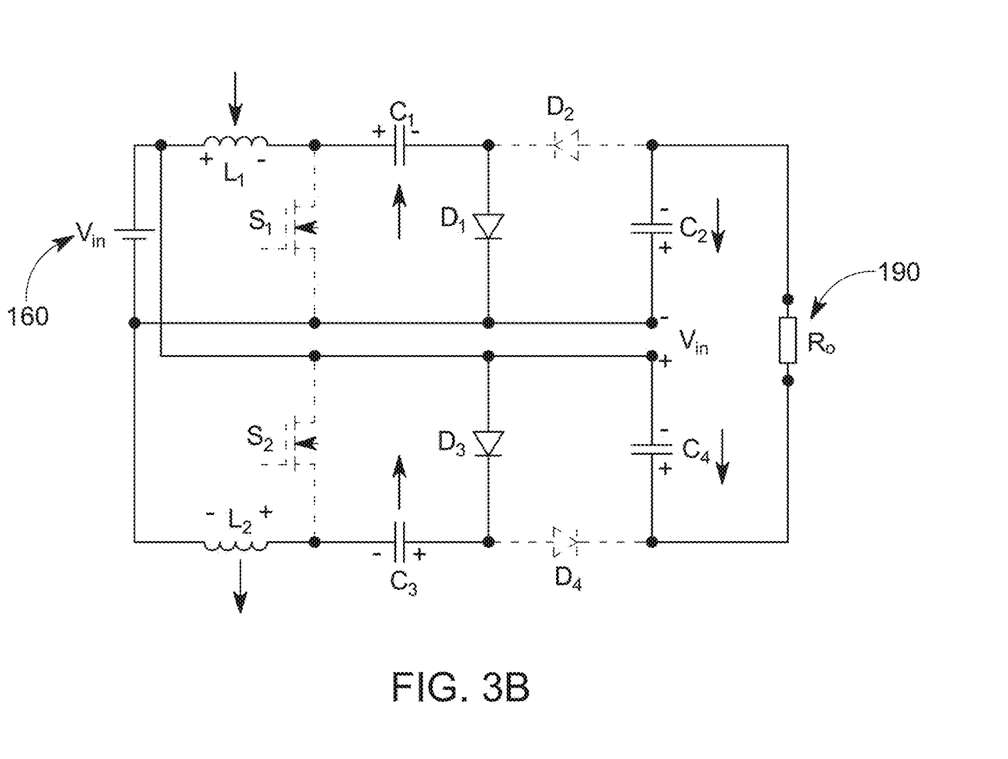
FIG. 3B illustrates a first transition state of the DC-to-DC converter.
Figure 3C:
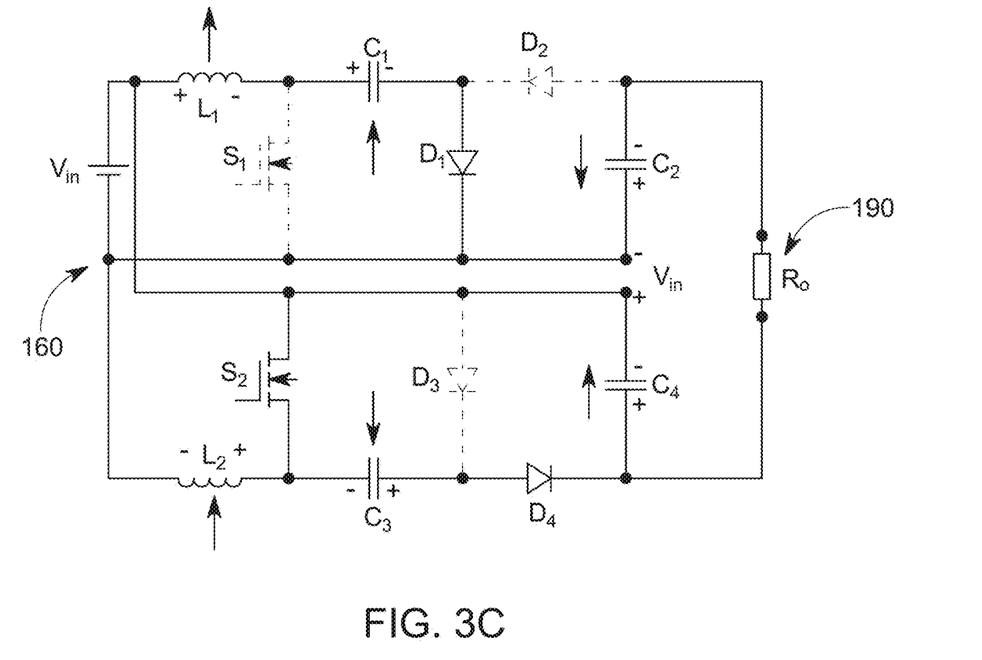
FIG. 3C illustrates a second state of the DC-to-DC converter.
Figure 3D:
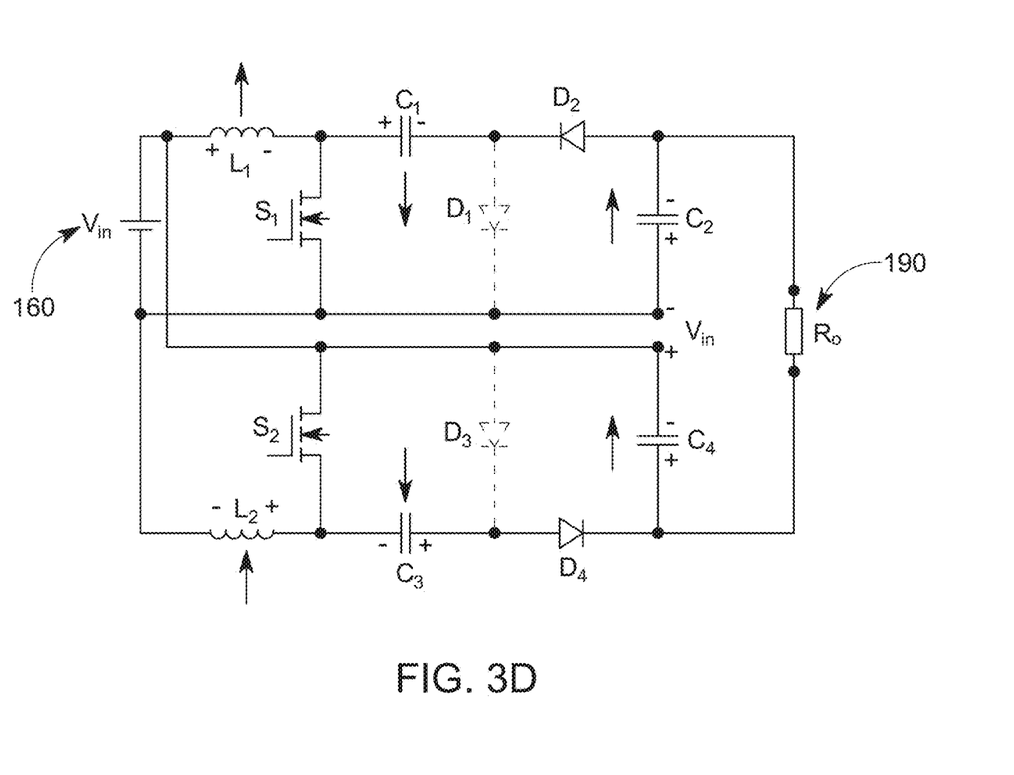
FIG. 3D illustrates a second state of the DC-to-DC converter.

FIG. 3A illustrates a first state in which the first switch S1 is closed and the second switch S2 is open, FIG. 3B illustrates a first transitional state in which both switches are open, FIG. 3C illustrates a second state in which the first switch S1 is open and the second switch S2 is closed, and FIG. 3D illustrates a second transitional state in which both switches are open. The switching frequency applied to the first and second switches makes the DC-to-DC converter 100 to iteratively move from one state to another, with the four states shown in FIGS. 3A to 3D repeating as long as the converter 100 is on.

The closing of the first switch S1 in FIG. 3A makes the first diode D1 and the fourth diode D4 to be polarized so that they do prevent a current flow. The closing of the first switch S1 also makes the current from the voltage source 160 to pass through the first inductor L1 and the first switch S1, thus charging the first inductor with energy. Simultaneously, the previously stored energy in the first capacitor C1 is transferred to the second capacitor C2, thus becoming available for the load 190. An arrow located next to each of the first inductor, first capacitor, and the second capacitor indicate how their energy is changing during the first state. For the lower inverting boost stage, the voltage source 160 increases the energy stored by the second inductor L2 and the third capacitor C3.

As the first switch S1 opens, the DC-to-DC converter 100 enters the first transition state shown in FIG. 3B. For this stage, the second diode D2 and the fourth diode D4 do not conduct electricity. The energy stored in the first inductor L1 is transferred to the first capacitor C1, the energy stored in the second inductor L2 is transferred to the third capacitor C3, and the second capacitor C2 and the fourth capacitor C4 transfer their energy (previously received from the corresponding inductors) to the load 190. Note that the load 190 is differentially connected between the floating output of these two capacitors.

Next, the second switch S2 is closed and the first switch S1 remains open, which makes the second diode D2 and the third diode D3 polarized to prevent the flow of electricity, as illustrated in FIG. 3C. For this second state, the roles of the upper and lower inverting boost stages are reversed, i.e., the voltage source 160 transfers energy to the second inductor L2 while the third capacitor C3 transfers energy to the fourth capacitor C4 through the fourth diode L4.

When both the first and second switches S1 and S2 are closed, as illustrated in the transition state in FIG. 3D, for the upper inverting boost stage, the voltage source transfers electrical energy to the first inductor L1 while the first capacitor C1 transfers energy to the second capacitor C2. For the lower inverting boost stage, the voltage source transfers electrical energy to the second inductor L2 while the third capacitor C3 transfers energy to the fourth capacitor C4. Next, the DC-to-DC converter 100 returns to the first state shown in FIG. 3A and the cycle shown by FIGS. 3A to 3D repeats.

The voltage boost for the converter 100 may be calculated based on Kirchhoff's laws as follows. For the first state, which is illustrated in FIG. 3A, the voltages on the first and second inductors L1 and L2 are given by:

$$V_{L1}=V_{in}, \quad (1)$$

$$V_{L2}=V_{in}-V_{C3}. \quad (2)$$

The capacitors C1 and C2 are connected in parallel, and thus, $$V_{C1}=V_{C2}. \quad (3)$$

The stresses $V_{D1}$ and $V_{D4}$ on first and fourth diodes D1 and D4 are derived as follows:

$$V_{D1}=V_{C1}, \quad (4)$$

$$V_{D4}=V_{C4}. \quad (5)$$

The current equations for the capacitors C1 to C4 are as follows:

$$I_{C1}=-I_{D2}, \quad (6)$$

$$I_{C2}=I_{D2}-I_0, \quad (7)$$

$$I_{C3}=I_{L2}, \quad (8)$$

$$I_{C4}=-I_0. \quad (9)$$

For the second state, which is illustrated in FIG. 3C, the voltages on the inductors L1 and L2 are:

$$V_{L1}=V_{in}-V_{C1}, \quad (10)$$

$$V_{L2}=V_{in}. \quad (11)$$

The capacitors C3 and C4 are connected in parallel, and thus $$V_{C3}=V_{C4}. \quad (12)$$

The voltage stresses $V_{D2}$ and $V_{D3}$ on the second and third diodes D2 and D3 are:

$$V_{D2}=V_{C2}, \quad (13)$$

$$V_{D3}=V_{C4}. \quad (14)$$

The current equations for the capacitors C1 to C4 in the second state are given by:

$$I_{C1}=I_{L1}, \quad (15)$$

$$I_{C2}=-I_0, \quad (16)$$

$$I_{C3}=-I_{D4}, \quad (17)$$

$$I_{C4}=I_{D4}-I_0. \quad (18)$$

The voltage across each capacitor C1 to C4 is found by the voltage second principle on L1 and L2 in the switching states. Thus, from eqs. (1), (2), (10), and (11), it follows that:

$$V_{C1} = V_{C2} = V_{C3} = V_{C4} = \frac{V_{in}}{1-D}. \quad (19)$$

Therefore, the voltage gain $V_0$ of the converter 100 is found at the output terminals (180, 182) to be:

$$V_0=V_{C2}+V_{in}+V_{C4}. \quad (20)$$

The gain $M_{ideal}$ is then found from eqs. (3,), (12), (19), and (20) to be:

$$M_{ideal} = \frac{V_0}{V_{in}} = \frac{3-D}{1-D}. \quad (21)$$

Figure 4:
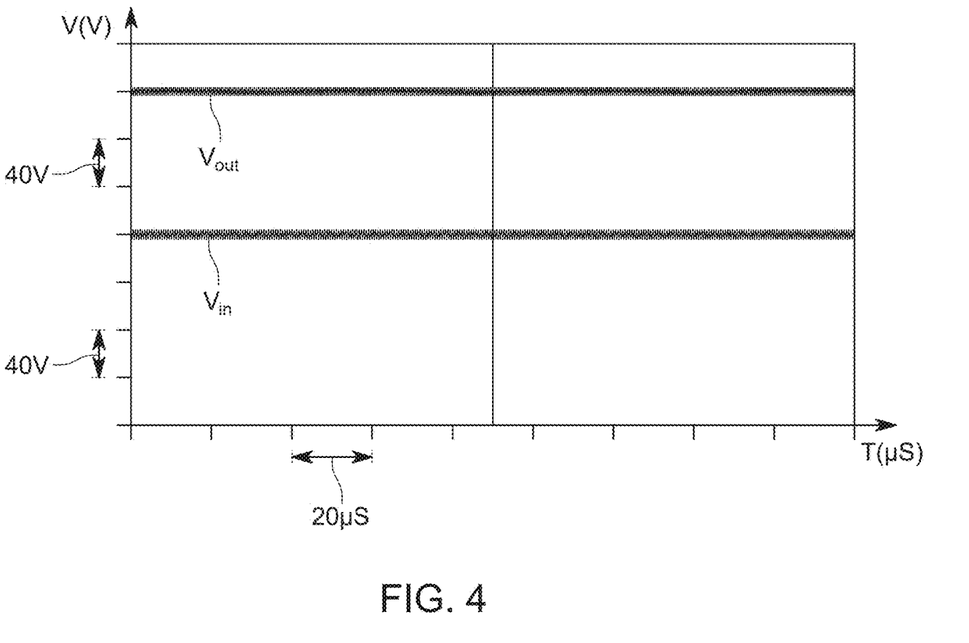
FIG. 4 illustrates a voltage input and a voltage output for the DC-to-DC converter of FIG. 1.
Figure 5:
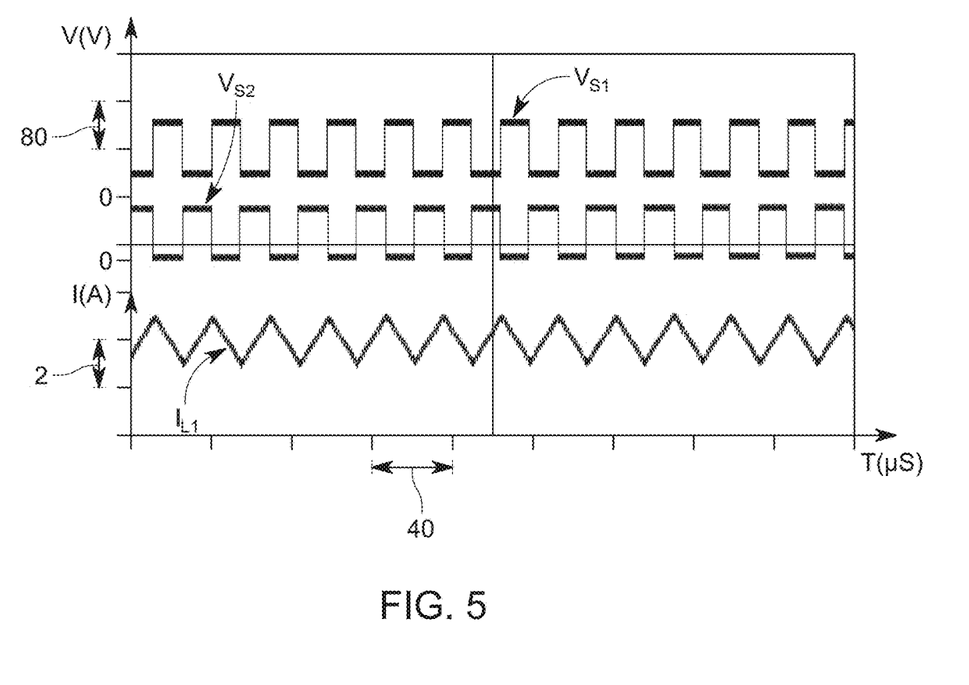
FIG. 5 illustrates the current through a first inductor of the DC-to-DC converter of FIG. 1 and also the voltages on the first and second switches.
Figure 6:
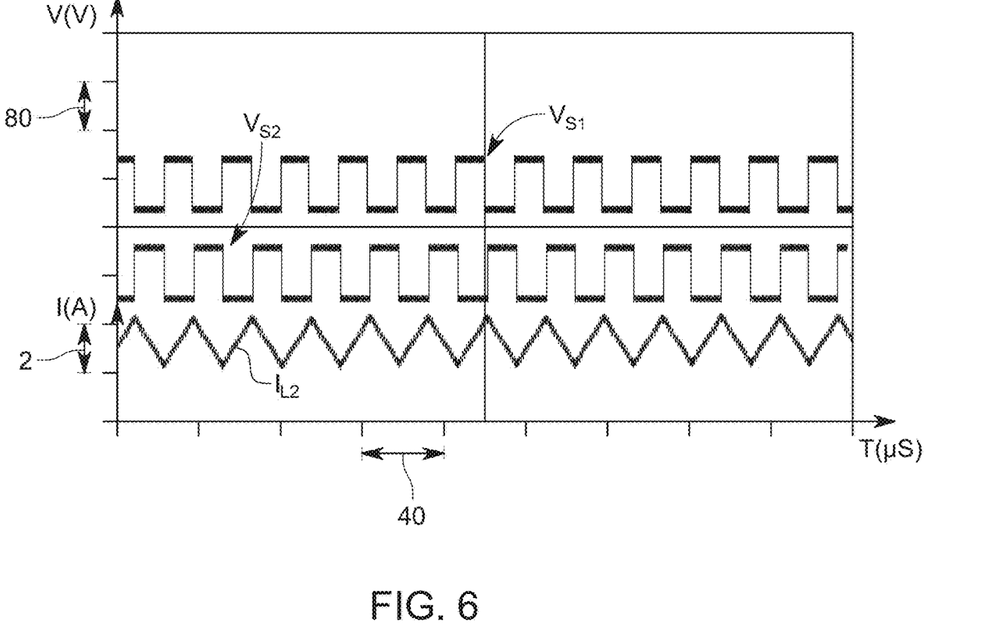
FIG. 6 illustrates the current through a second inductor of the DC-to-DC converter of FIG. 1 and also the voltages on the first and second switches.
Figure 7:
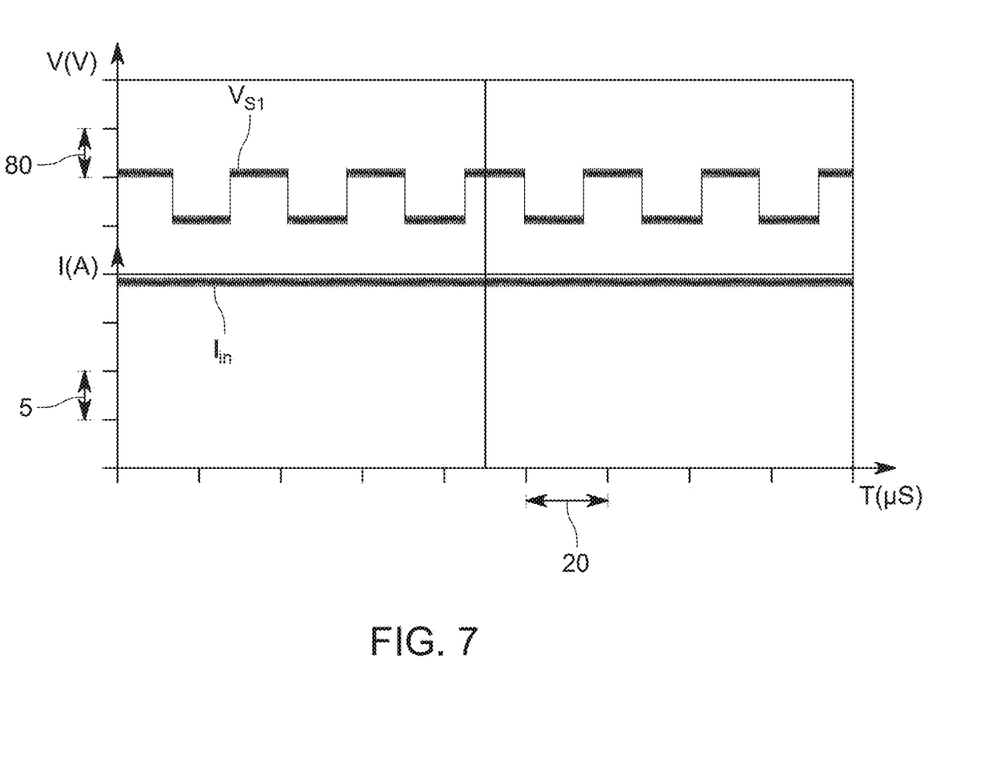
FIG. 7 illustrates the input current versus time for the DC-to-DC converter of FIG. 1.
Figure 8A:
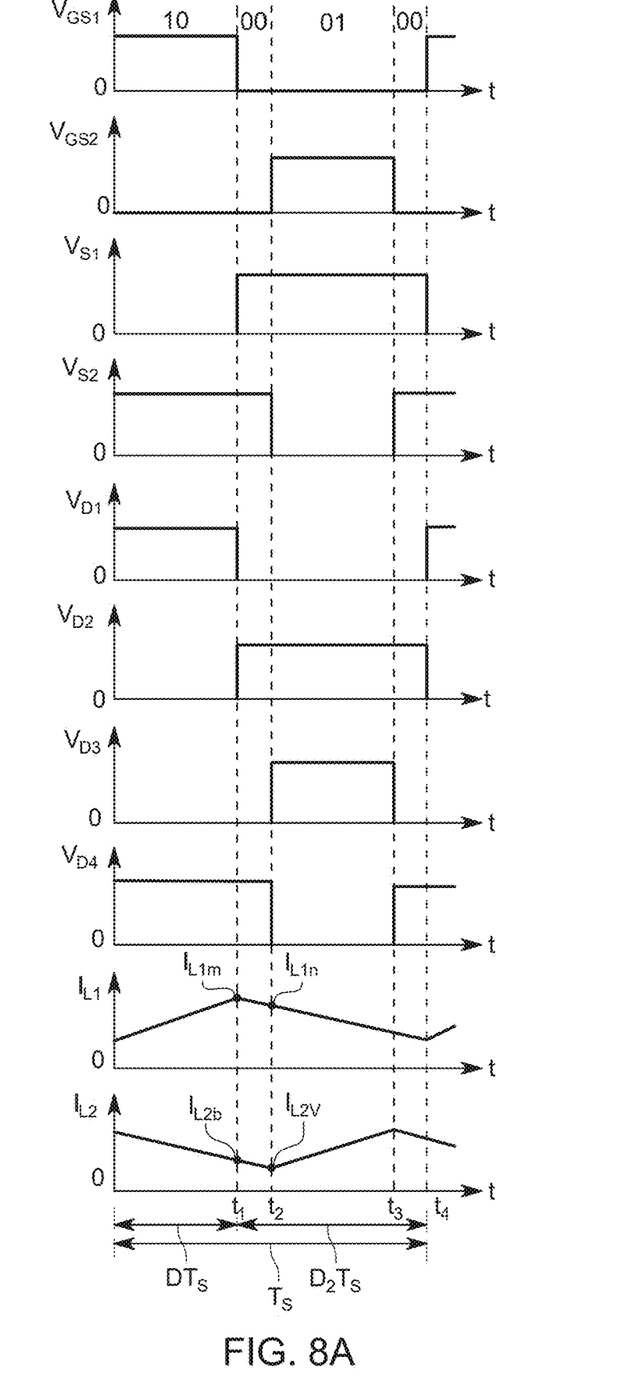
FIGS. 8A and 8B illustrate the various voltages and currents applied to the elements of the DC-to-DC converter of FIG. 1.
Figure 8B:
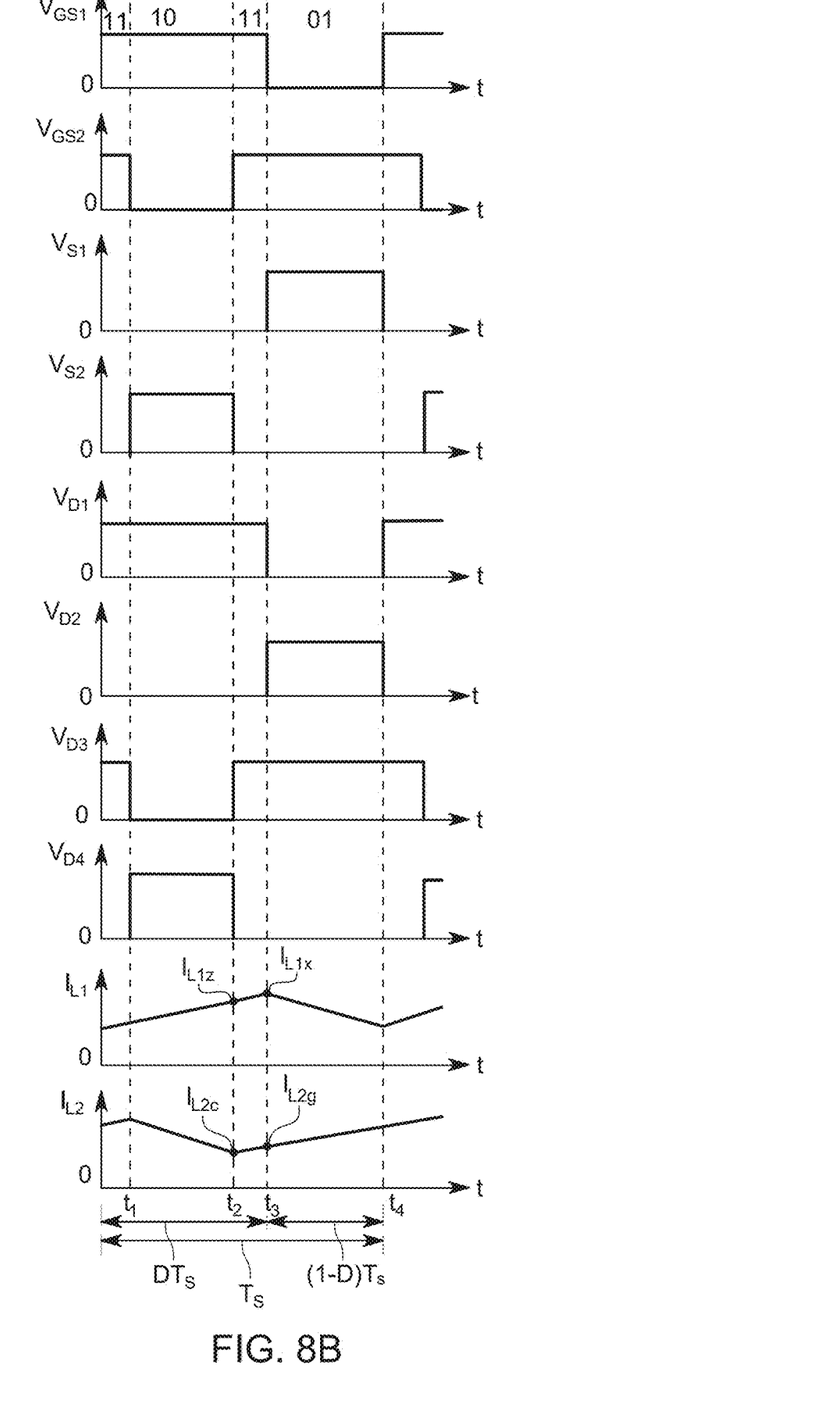

For the DC-to-DC converter 100, having the values shown in the table of FIG. 2, the currents and voltages during the various stages have been measured. As shown in FIG. 4, the DC-to-DC converter 100 stepped up an input voltage of 40 V to about 200V when the converter operates at 50% duty D. Note that the duty D represents the time interval during which the states shown in FIGS. 3A to 3D take place. A 50% duty means that the converter 100 is about 50% of the time period in the first state of FIG. 3A, and about 50% of the time period in the second state of FIG. 3C. The states in FIGS. 3B and 3D are transitory states, i.e., they occupy a very small time period from the duty D. FIG. 5 shows the increasing and decreasing current $I_{L1}$ through the first inductor L1, and the corresponding voltages $V_{S1}$ and $V_{S2}$ at the two switches S1 and S2. FIG. 6 shows the increasing and decreasing current $I_{L2}$ through the second inductor L2, and the corresponding voltages $V_{S1}$ and $V_{S2}$ at the two switches S1 and S2. FIG. 7 shows the input current $I_{in}$ of the converter 100 having almost no ripples and an average value of 5 A while the voltage at the second switch S2 is turned on and off, with a maximum value of 80V. FIGS. 8A and 8B show the signals, currents, and/or voltages applied to the various elements of the converter 100 during the first state (FIG. 8A) and the second state (FIG. 8B). Note that $V_{GS1}$ and $V_{GS2}$ are the signals applied to the gates of the switches S1 and S2, by the controller 192.

One of the challenges in the boost-derived DC-to-DC converters is the high input current flowing through the inductors L1 and L2. To further address this challenge, in the embodiment illustrated in FIG. 9, a converter 900 is configured to interleave the inductors and switches. Thus, the interleaved converter 900 shows two additional switches S1' and S2' and two additional inductors L1' and L2'. This interleaving reduces the stress on the individual components, as the total current is shared among multiple inductors and switches, allowing each to handle only a fraction of the load. Consequently, smaller and more cost-effective components can be used. Additionally, this approach improves thermal management by evenly distributing the heat across the components, minimizing the risk of overheating. Furthermore, the converter's power handling capability is significantly enhanced, as the shared current distribution enables it to efficiently manage higher power levels.

More specifically, as illustrated in FIG. 9, a first terminal of the additional first inductor L1' is connected to the first input terminal 110A, which is connected to the positive terminal 162 of the voltage source 160. A second terminal of the additional first inductor L1' is connected to a first common point 910, to which the following terminals are also connected to: the second terminal of the first inductor L1, the first terminal of the first switch S1, a first terminal of the first additional switch S1', and the first terminal of the first capacitor C1. A second terminal of the first additional switch S1' is connected to the first common terminal 166.

A first terminal of the additional second inductor L2' is connected to the second input terminal 120A, which is connected to the negative terminal 164 of the voltage source 160. A second terminal of the additional second inductor L2' is connected to a second common point 912, to which the following terminals are also connected to: the second terminal of the second inductor L2, the first terminal of the second switch S2, a first terminal of the second additional switch S2', and the first terminal of the third capacitor C3. A second terminal of the second additional switch S2' is connected to the second common terminal 168.

The various states of the interleaved DC-to-DC converter 900 are similar to those illustrated in FIGS. 3A to 3D, and thus their description is omitted herein. The differences between the converter 100 in FIG. 1 and the interleaved converter 900 in FIG. 9 are that for the present embodiment, the voltage source transfers energy to both the first inductor and the first additional inductor (the same for the state when the voltage source transfers energy to the second inductor), and the first inductor and the first additional inductor (or the second inductor and the second additional inductor) transfer electrical energy to the second capacitor (or the fourth capacitor). Also, for the present embodiment, the first switch and the first additional switch are ON and OFF simultaneously (the same for the second switch and the second additional switch).

Figure 10:
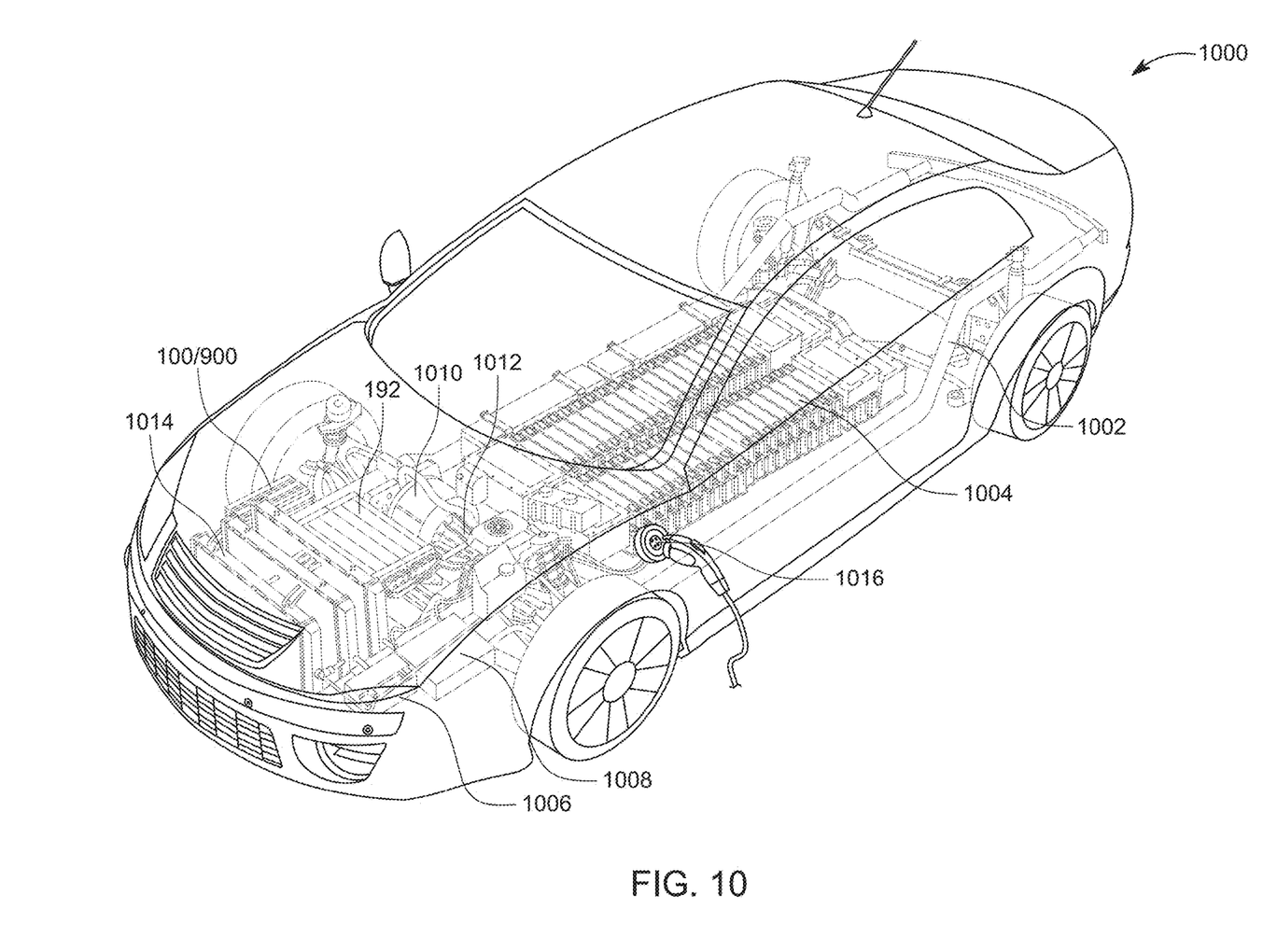
FIG. 10 illustrates an electrical vehicle that uses the DC-to-DC converter of FIG. 9.

In one embodiment, as illustrated in FIG. 10, the converter 100 or the interleaved converter 900 is used in an electrical vehicle (EV) 1000. The EV 1000 includes a frame 1002, which supports a battery pack 1002. The battery pack 1002 is electrically connected to the converter 100 or 900. A power electronics controller 192 controls the converter 100/900, as previously discussed, to implement the first and second states, and also the first and second intermediate states, all illustrated in FIGS. 3A to 3D. The EV 1000 may also include an auxiliary battery 1006, an onboard charger 1008, an electric motor 1010 which is electrically connected to the converter 100/900, a transmission mechanism 1012 for transmitting the power from the motor to the wheels of the EV 1000, a thermal cooling system 1014 for cooling or heating the EV and/or the motor or other components, and a charge port 1016 for charging the battery pack 1004.

Figure 11:
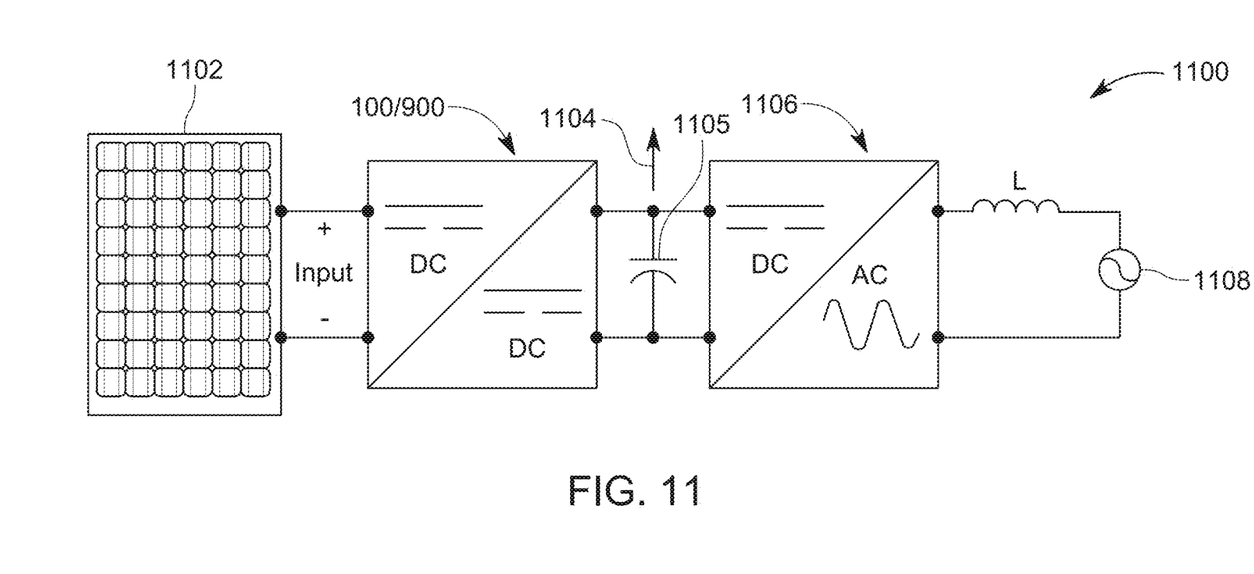
FIG. 11 illustrates a PV system that uses the DC-to-DC converter of FIG. 9.

In another embodiment, as illustrated in FIG. 11, the converter 100/900 may be used with one or more PV panels 1102 in a PV system 1100 to increase the low voltage produced by the PV panels. For this configuration, the PV system 1100 may also include a DC link 1104 to a DC-to-AC inverter 1106 before being connected to the utility grid 1108. The structure of the DC link 1104 (for example, a polarized capacitor 1105), and the DC-to-AC inverter 1106 are known in the art, and thus, their description is omitted in this document.

Figure 12:
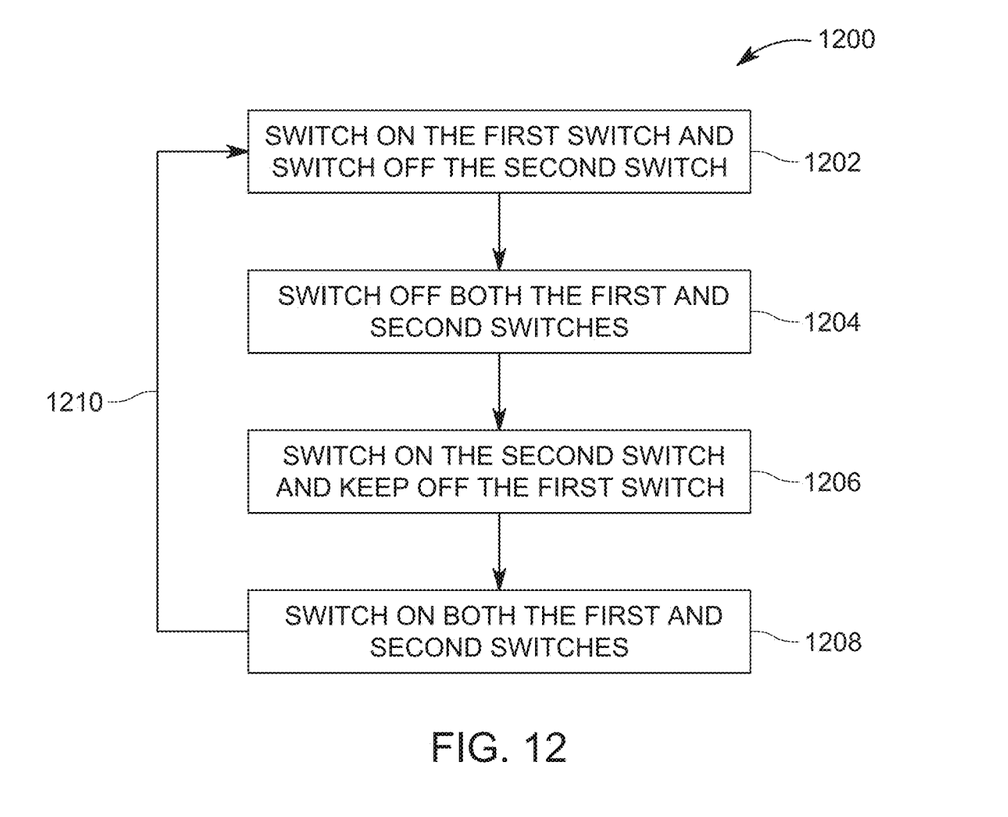
FIG. 12 is a flow chart of a method for switching on and off plural switches associated with the DC-to-DC converter of FIG. 1 or FIG. 9.

A method 1200 for controlling the converter 100 or 900 is now discussed with regard to FIG. 12. The method 1200 starts with step 1202 in which the controller 192 switches ON the first switch S1 and switches OFF the second switch S2 to achieve the first state of the converter shown in FIG. 3A. The switching time is determined by the duty D discussed above, and the switching frequency. In step 1204, the controller switches OFF both the first and second switches S1 and S2 for entering the first transition state, which is illustrated in FIG. 3B. In step 1206, the controller switches OFF the first switch S1 and switches ON the second switch S2 to achieve the second state of the converter, as illustrated in FIG. 3C. In step 1208, the controller switches ON both the first and second switches S1 and S2 for achieving the second transition state, as illustrated in FIG. 3D. These steps take place during a full period. Then, the controller repeats in step 1210 the previous steps.

The term "about" is used in this application to mean a variation of up to 20% of the parameter characterized by this term.

It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide a DC-to-DC converter that reduces the ripples in the input current. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The entire content of all the publications listed herein is incorporated by reference in this patent application.

[1] A. Allehyani: "An Interleaved High Gain DC-DC Converter with Direct Power Flow Path". IEEE Energy Conversion Congress and Exposition (ECCE), 978-1-7281-9387-8/22, 2022, DOI: 10.1109/ECCE50734.2022.9947856.

What is claimed is:

1. A step-up, non-isolated, direct current (DC)-to-DC converter comprising:
a first inverting boost stage having (1) a first input terminal configured to be electrically connected to a first terminal of a DC voltage source, (2) a first common terminal configured to be electrically connected to a second terminal of the DC voltage source (160), (3) a first switch S1, and (4) a first additional switch S1';
a second inverting boost stage having (1) a first input terminal configured to be electrically connected to the second terminal of the DC voltage source, (2) a second common terminal configured to be electrically connected to the first terminal of the DC voltage source, (3) a second switch S2, and (4) a second additional switch S2';
the first inverting boost stage having a first output terminal configured to be electrically connected to a first terminal of a load; and
the second inverting boost stage having a second output terminal configured to be electrically connected to a second terminal of the load,
wherein an output voltage generated by first and second inverting boost stages, between the first and second output terminals, includes at least a direct voltage contribution from the DC voltage source.

2. The converter of claim 1, wherein the first inverting boost stage includes: (a) a first inductor L1, (b) a first additional inductor L1', (c) the first switch S1, (d) the first additional switch S1', (e) a first inverting module including a first capacitor C1 and a first diode D1, (f) a second capacitor C2, and (g) a second diode D2,
wherein the first inverting module is configured to invert a polarity of the second capacitor C2.

3. The converter of claim 2, wherein the first inductor L1 and the first switch S1 are interleaved with the first additional inductor L1' and the first additional switch S1'.

4. The converter of claim 2, wherein the output voltage generated by the first and second inverting boost stages, between the first and second output terminals, further includes a voltage across the second capacitor C2.

5. The converter of claim 2, wherein the second inverting boost stage includes: (a) a second inductor L2, (b) a second additional inductor L2', (c) the second switch S2, (d) the second additional switch S2', (e) a second inverting module including a third capacitor C3 and a third diode D3, (f) a fourth capacitor C4, and (g) a fourth diode D4,
wherein the second inverting module is configured to invert a polarity of the fourth capacitor C4.

6. The converter of claim 5, wherein the second inductor L2 and the second switch S2 are interleaved with the second additional inductor L2' and the second additional switch S2'.

7. The converter of claim 5, wherein the output voltage generated by the first and second inverting boost stages, between the first and second output terminals, further includes a voltage across the fourth capacitor.

8. The converter of claim 7, wherein the second capacitor, the direct voltage contribution, and the fourth capacitor are polarized in the same way so that corresponding voltages are summed up to generate the output voltage $V_O$.

9. The converter of claim 1, further comprising:
a controller configured to switch ON and OFF first to fourth switches of the first and second inverting boost stages, with a frequency between 2 and 200 kHz.

10. The converter of claim 9, wherein the controller is configured to (i) switch ON a first switch S1 and a first additional switch S1' and switch OFF a second switch S2 and a second additional switch S2', to enter a first state of the converter, (ii) switch OFF the first and second switches S1 and S2 and the first and second additional switches S1' and S2' to enter a first transition state, (iii) switch OFF the first switch S1 and the first additional switch S1' and switch ON the second switch S2 and the second additional switch S2', to enter a second state of the converter, and (iv) switch ON the first and second switches S1 and S2 and the first and second additional switches S1' and S2', to enter a second transition state, during a full period.

11. A low-voltage generating system comprising:
a low-voltage source; and
a direct current (DC)-to-DC converter electrically connected to the low-voltage source and configured to step up an input voltage received from the low-voltage source,
wherein the DC to DC converter includes:
a first inverting boost stage having (1) a first input terminal configured to be electrically connected to a first terminal of a DC voltage source, (2) a first common terminal configured to be electrically connected to a second terminal of the DC voltage source, (3) a first switch S1, and (4) a first additional switch S1';
a second inverting boost stage having (1) a first input terminal configured to be electrically connected to the second terminal of the DC voltage source, (2) a second common terminal configured to be electrically connected to the first terminal of the DC voltage source, (3) a second switch S2, and (4) a second additional switch S2';

the first inverting boost stage having a first output terminal configured to be electrically connected to a first terminal of a load; and the second inverting boost stage having a second output terminal configured to be electrically connected to a second terminal of the load, wherein an output voltage generated by first and second inverting boost stages, between the first and second output terminals, includes at least a direct voltage contribution from the DC voltage source.

12. The system of claim 11, wherein the low-voltage source is a DC battery pack of an electrical vehicle or a photovoltaic panel.

* * * * *